United States Patent [19]

Yu

[11] Patent Number: 5,394,590
[45] Date of Patent: Mar. 7, 1995

[54] HINGE ASSEMBLY FOR A GRILL

[76] Inventor: Norman Yu, 4th Fl.-2, No. 1, Alley 5, Lane 521, Min Sheng Rd., 20 Lin, Shang Feng Tsun, Ta Ya Hsiang, Taichung Hsien, Taiwan, Prov. of China

[21] Appl. No.: 117,298
[22] Filed: Sep. 7, 1993
[51] Int. Cl.⁶ ............................................. E05D 11/06
[52] U.S. Cl. .................................. 16/357; 126/25 R
[58] Field of Search ................. 16/357, 358, 359, 360; 126/25 R, 25 A, 25 AA; 220/333; 49/248

[56] References Cited

U.S. PATENT DOCUMENTS

| | | | |
|---|---|---|---|
| 822,649 | 6/1906 | Carter | 16/358 |
| 2,850,760 | 9/1958 | Vanderwalker | 220/333 |
| 3,344,462 | 10/1967 | Webster | 16/357 |
| 3,611,915 | 10/1971 | Glaser | 126/25 R |
| 3,714,937 | 2/1973 | Linstead | 16/357 |
| 3,785,275 | 1/1974 | Keats et al. | 126/25 R |
| 3,931,805 | 1/1976 | Nelson | 126/25 R |
| 4,062,340 | 12/1977 | Huff | 126/25 R |
| 5,111,802 | 5/1992 | Lin . | |

FOREIGN PATENT DOCUMENTS 1064847  9/1959  Germany ............................. 16/357

Primary Examiner—P. Austin Bradley
Assistant Examiner—Chuck Y. Mah
Attorney, Agent, or Firm—Parkhurst, Wendel & Rossi

[57] ABSTRACT

A hinge assembly for a grill of the type which includes a cover and a bowl, each having a front wall, a rear wall, two side walls and four rounded corners. A handle is formed on a front end of the cover, and a plurality of legs are formed from a bottom portion of the bowl. The cover and the bowl are connected by a hinge assembly having two hinge sets, each including first and second hinge members, each of the hinge members having first and second ends, the first ends are respectively pivoted to an inner surface of the cover, and the second ends are pivoted with each other by a connecting element extending through a first slot formed in the side wall of the bowl. The second end of the second hinge member having a second slot formed therein through which the connecting element extends.

3 Claims, 4 Drawing Sheets

HINGE ASSEMBLY FOR A GRILL

BACKGROUND OF THE INVENTION

The present invention relates to a hinge assembly for connecting a cover to a bowl of a grill, more particularly, to a hinge assembly having a simple structure enabling a cover of the grill to be maintained in an open position or to guide the cover to swing to the closed position on the bowl.

An embodiment of an outdoor grill is described in U.S. Pat. No. 4,062,340 comprising a cover 19 and a bowl 7 connected by two hinge sets 31, 31a, each hinge sets including a pair of hinge members 33, 35 and 33a, 35a pivoted separately between the cover 19 and the bowl 7 on inner surface thereof. Each of the hinge members 33, 35 and 33a, 35a has first and second ends, each of the first ends is pivoted on the inner surface of the cover 19, and each of the second ends is pivoted on the inner surface of the bowl 7, which form a linkage system to define the open and closed position between the cover 19 and the bowl 7. When in the fully open position, each of the hinge members 35, 35a rests upon an upper portion of its corresponding first members 33, 33a. However, the whole linkage includes two pairs of hinge members 33, 35 and 33a, 35a, and eight pivot means for pivoting each end of the members, which is not economical to manufacture. Further, in order to achieve a firm open position with the cover 19 upstanding beside an end of the bowl, and to assure the hinge members 35, 35a contact the whole upper portion of the member 33 and 33a, the outer periphery of the members 33, 35 and 33a, 35a, and the very point of pivoting have to be defined precisely, or frictional damage will arise therebetween, and the fitting between the cover and the bowl will fail.

The present invention intends to provide an improved hinge set to mitigate and/or obviate the above-mentioned problems.

SUMMARY OF THE INVENTION

The present invention provides a hinge set which includes first and second members, each of the members having first and second ends in which each of the first ends is pivoted to an inner surface of a cover of the grill. The second ends of the members are pivoted with each other by extending a connecting element through a first slot formed on a side wall of the bowl. The second end of the second hinge member has a second slot formed therein through which the connecting element extends and allows relative movement therebetween.

For a better understanding of the present invention and objects thereof, a study of the detailed description of the embodiments described hereinafter should be made in relation to the accompanying drawings.

DETAILED DESCRIPTION OF THE PREFERRED EMBODIMENTS

Figure 1:
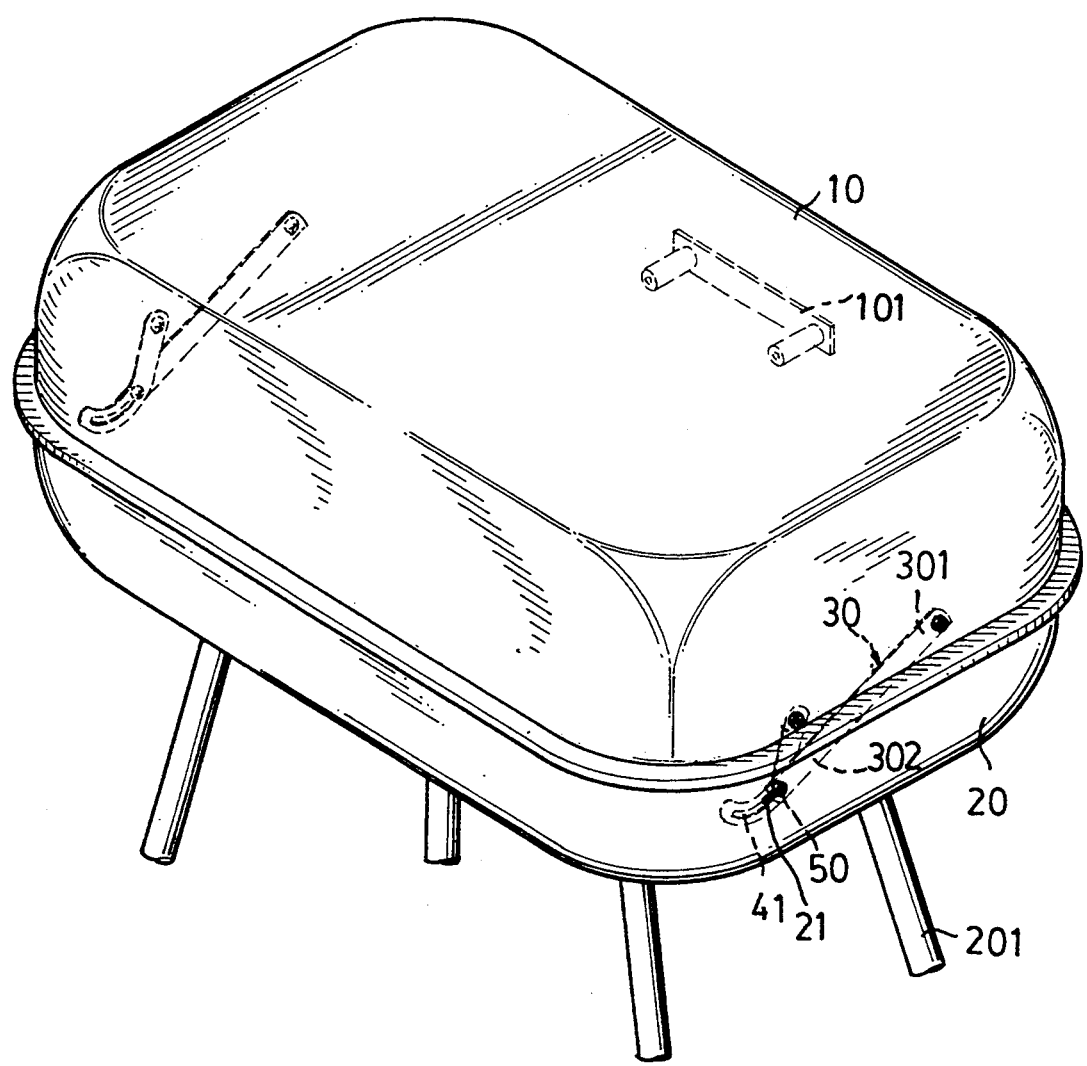
FIG. 1 is a perspective view of a hinge assembly for a grill in accordance with the present invention, the grill shown in a closed position.
Figure 4:
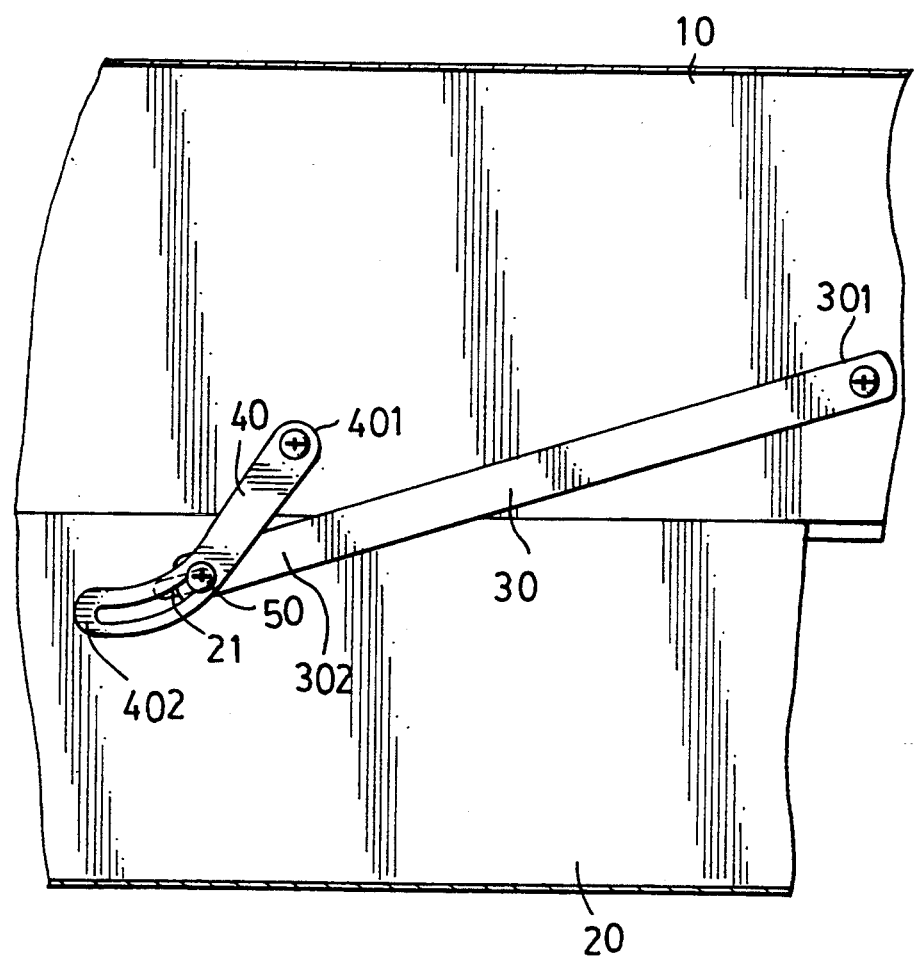
FIG. 4 is a side elevational view partly in cross section of the hinge assembly in closed position.

Referring to the drawings and initially to FIGS. 1 and 4, a grill includes a substantially rectangular cover 10 with a handle 101 disposed on a front end thereof, and a substantially rectangular bowl 20 with a plurality of legs 201 projecting from a bottom thereof. The cover 10 and the bowl 20 each have a front wall, a rear wall and two side walls extending substantially vertically around their periphery and have four rounded corners. A first slot 21 is formed in each side wall of the bowl 20, which extends from the point 22 of beginning of the rounded corner toward to the rear end of the bowl 20. The cover 10 and the bowl 20 are connected by two hinge sets which enable the cover 10 to be swung upwardly by lifting the handle 101 to open the grill. Each hinge set includes first and second hinge members 30, 40, each of the members 30, 40 having first and second ends 301, 401 and 302, 402. The first ends 301, 401 are respectively pivoted to an inner surface of an associated side of the cover 10. The second ends 302, 402 are pivoted with each other by a connecting element 50 extending through the side wall of the bowl 20 at the point 22, which allows relative movement between the second slot 41 and the connecting element 50. When in closed position, the connecting element 50 contacts against an inner end of the second slot 41 which is curved downwards toward to the rear end of the grill.

Figure 2:
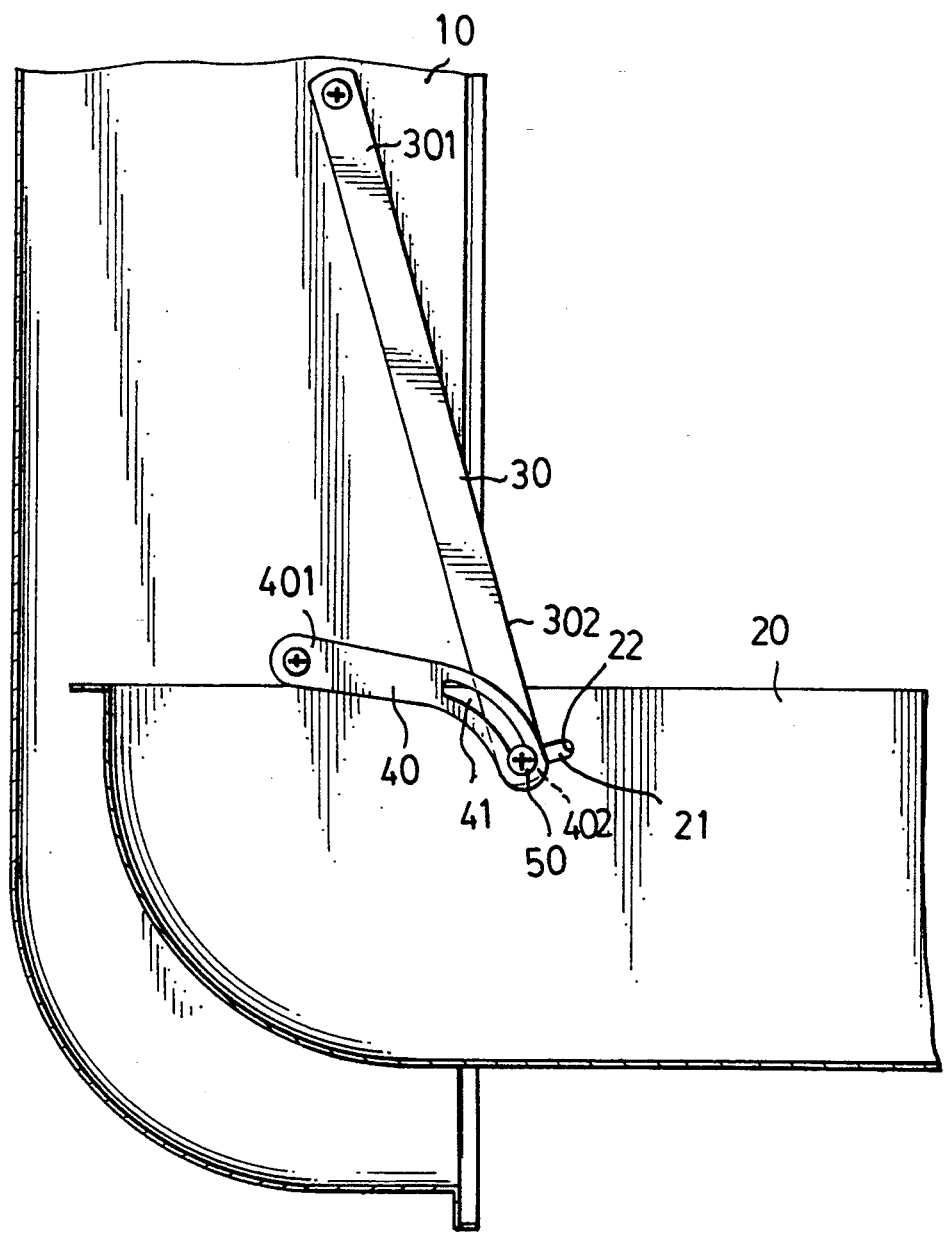
FIG. 2 is a partial side elevational view of the hinge assembly in an open position in accordance with the present invention.
Figure 3:
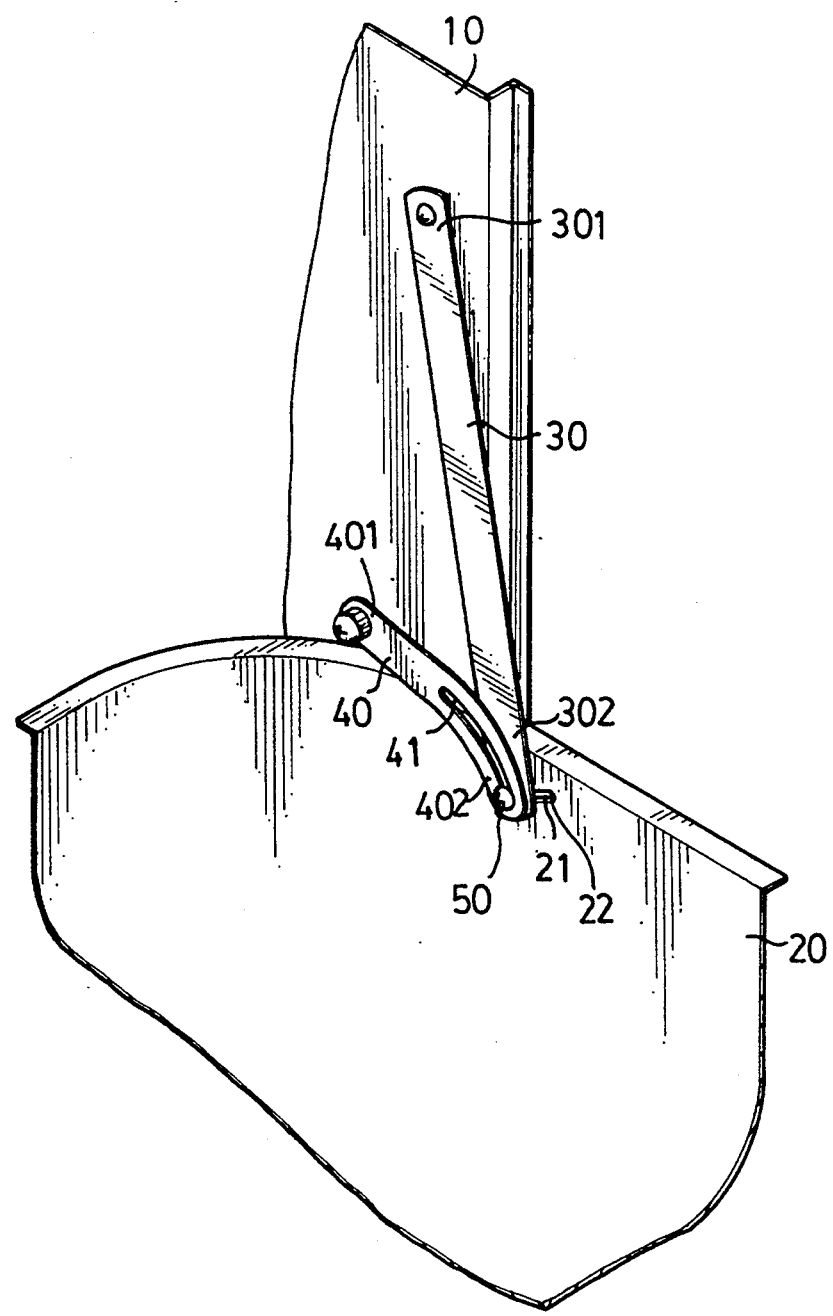
FIG. 3 is a side elevational view partly in cross section of the hinge assembly in open position.

Referring to FIGS. 2 and 3, when using the grill, a user pushes the cover 10 towards the rear end of the grill, the connecting element 50 is pushed by the second end 301 of the first hinge member 30 to which is pivoted, this enables the element 50 to slide within the first slot 21 and pass over the point 22 of the beginning of the rounded corner. Then the user swings the cover 10 by lifting the handle 101, the second end 302 of the first hinge member 30 then is swung counterclockwise and pushes the second end 402 of the second hinge member 40 to swing towards to the same direction as the first hinge member 30, and the connecting element 50 slides within the slot 41 simultaneously. Element 50 is moved over the point 22 within the slot 41, the side of the cover 10 is swung about the axle of the element 50 and passes over the rounded corner of the bowl 20 and mounts on rear end of the bowl 20 vertically, which is the position of being fully open. To close the cover, the above described process is operated in reverse.

Although the invention has been explained in relation to its preferred embodiment, it is to be understood that many other possible modifications and variations can be made without departing from the spirit and scope of the invention as hereinafter claimed.

I claim:

1. A hinge assembly for a grill of the type comprising a cover and a bowl each having a front wall, a rear wall, two side walls and four rounded corners, said front wall of said cover having a handle, each of said side walls of said bowl having a first slot formed therein, said bowl having a plurality of legs projecting from said bottom thereof, said hinge assembly comprising:

two hinge sets each including first and second hinge members, each said first and second hinge members having first and second ends in which said first ends are respectively pivoted to an inner surface of each said side wall of said cover, and said second ends being pivoted with each other by a connecting element extending through said first slot of said side wall of said bowl, said second end of said second hinge member having a second slot formed therein through which said connecting element extends, said first slot extending from a point where a curvature of said rounded corner is initiated, toward a corresponding end of said bowl.

2. The hinge assembly for a grill as claimed in claim 1 wherein said second slot is a curved slot.

3. A grill comprising a cover and a bowl each having a front wall, a rear wall, two side walls and four rounded corners, a handle formed on said front wall of the cover, and a bowl having a plurality of legs projecting from a bottom portion thereof, each said side walls having a first slot formed therein, said cover and said bowl being connected by a hinge assembly which comprises two hinge sets each including first and second hinge members, each said hinge members having first and second ends and said first ends being respectively pivoted to an inner surface of said side wall of said cover, and said second ends being pivoted with each other by a connecting element extending through said first slot of said side wall of said bowl, said second end of said second hinge member having a second slot formed therein through which said connecting element extends, said first slot extending from a point where a curvature of said round corner is initiated, toward a corresponding end of said bowl.

* * * * *